US006755283B2

(12) United States Patent
Lin (10) Patent No.: US 6,755,283 B2
(45) Date of Patent: Jun. 29, 2004

(54) SPIRAL PROPELLER

(76) Inventor: You Lin, No. 33, Feng Xi Lane, Shen Li Road, City of Jiangmen, Guangdong Province (CN)

( * ) Notice: Subject to any disclaimer, the term of this patent is extended or adjusted under 35 U.S.C. 154(b) by 0 days.

(21) Appl. No.: 10/093,216

(22) Filed: Mar. 6, 2002

(65) Prior Publication Data

US 2002/0125075 A1 Sep. 12, 2002

(30) Foreign Application Priority Data

Mar. 7, 2001  (CN) .......................................... 01107629

(51) Int. Cl.[7] ............................ B66B 9/02; B66B 11/04
(52) U.S. Cl. ........................ 187/270; 187/250; 187/271; 182/141; 74/424.6
(58) Field of Search .................................. 187/267, 268, 187/270, 271, 250; 182/130, 131, 141; 74/424.6, 465

(56) References Cited

U.S. PATENT DOCUMENTS

| | | | | | |
|---|---|---|---|---|---|
| 647,491 | A | * | 4/1900 | Hoffmann | .................... 187/271 |
| 696,994 | A | * | 4/1902 | Modry | ........................ 187/271 |
| 698,738 | A | * | 4/1902 | Roney | ......................... 187/271 |
| 1,539,761 | A | * | 5/1925 | Murray | ......................... 414/228 |
| 1,953,772 | A | * | 4/1934 | Phillips | ....................... 187/271 |
| 4,285,249 | A | * | 8/1981 | Kume | ...................... 74/424.93 |
| 4,541,297 | A | * | 9/1985 | Fujita | ......................... 74/424.6 |
| 5,636,705 | A | * | 6/1997 | St-Germain | ................. 182/141 |
| 6,095,285 | A | * | 8/2000 | St-Germain | ................. 182/146 |

FOREIGN PATENT DOCUMENTS

SU         1191408 A  * 11/1985 ................. 187/250

* cited by examiner

Primary Examiner—Eileen D. Lillis
Assistant Examiner—Thuy V. Tran
(74) Attorney, Agent, or Firm—Raymond Y. Chan; David and Raymond Patent Group (57) ABSTRACT

A spiral propeller provides a better secure and a more reliable spiral comprising spiral-lifting wheels, interlocking wheel interlocked with the spiral-lifting wheel, and fixed track supporting the interlocking wheel; the spiral lifting wheel is a rotating wheel with spiral external teeth, which is fixed at the top of the compartment, so as to drive the compartment for upward and downward movements, and interlock with the interlocking wheel; a interlocking rotating wheel of truncated cone shape, which can rotate along the axial direction of the wheel itself; a fixing track is set up between the guide brackets of the elevator, i.e., between the vertical supporting brackets of the guide bracket, in the appropriate locations are set with interlocking wheels.

7 Claims, 8 Drawing Sheets

SPIRAL PROPELLER

BACKGROUND OF THE PRESENT INVENTION

1. Field of Invention

The invention is related to the lifting appliance of elevators, and more particularly to a spiral propeller for elevators by making use of the spiral lifting mechanism. The propeller provides a safe lifting mode, which can be widely applied in multiple lifting systems such as lifts, elevators and etc., and increase the security performance of the lifting system to a large extent.

2. Description of Related Arts

Since the invention of the first elevator by Otis, elevators have evolved into a titanic industry gradually with the further development of technologies and people's increasing demands. The applications of elevators have become more and more widely, and have been warmly welcomed by people, especially those of developed countries with tremendous population and scarce geographical resources. Furthermore, elevators have become a must for high buildings.

At present, the elevators of vertical lifting, especially those elevators carrying people and goods in high buildings, are still employing the steel rope system for their lifting mechanism, i.e., the top of the elevator is fixed with the steel ropes to haul the steel ropes of the elevator, the steel ropes are led out from the top of the elevator, pass upwards through two pulleys set up on the guide bracket, then run downwards to the traction block for connection. During lifting, power electric motors are used to haul it for ascending or descending. The mode brings forward very rigorous demand on the steel ropes, pulleys and the support bars of pulleys, especially when the lifting elevation is very high.

Viewed from the process, the components mentioned above are the most important parts to bear weight. The steel ropes shall bear the weight of the elevator compartment itself, as well as the weight of the passengers or goods carried by the compartment. The steel ropes transfer the born weight to the pulleys, which will forward the force to the guide bracket via the pulley shafts, and the shafts deliver the force to the ground. The most important parts bearing weight are the pulleys and the pulley brackets except for the steel ropes. What's more, the bearing point for the weight of the compartment and the passengers and goods the compartment carries concentrates on the minor contact surface between the pulleys and the steel ropes, which is highly concentrated.

Firstly, as far as steel ropes are concerned, the pulling force born by the cross section of the unit steel rope is quite limited due to the manufacturing techniques at present, in addition, there exists the problem of fatigue for steel ropes. Steel ropes have to possess certain tenacity and sufficient radial distance, so as to ensure their strength, usually, a group of steel ropes is adopted to form the ropes to achieve this purpose. For the elevators in high buildings, the steel ropes bear the maximum pulling force when they start to ascend, especially for high-speed elevators, though the pulling force born during normal running is not so strong, the pulling force they bear during sudden ascending will be far stronger than the force during normal operation, as a result, the quantity of the steel ropes must be increased to bear the pulling force. The negative impact brought forward is obvious, i.e., the weight of the group of steel ropes has to be greatly increased, which will certainly increase the burden of the steel ropes. For the high buildings with many stories, the weight of the steel ropes is often larger than that of the elevator compartment.

At the same time, the aging of steel ropes remains a major difficulty, which results in two aftermaths: first, the steel ropes will be lengthened. Elevators have to be used frequently for a long time, after a period of time, the steel ropes will gradually age, and their tenacity will decrease. It is because of long-term weight bearing, the steel ropes will be slowly pulled lengthened under the influence of exterior force, which will lead to errors in the distance between the elevator compartment and the story it stays at. To avoid the unnecessary errors and the accidents that may happen due to the errors, it is necessary to perform periodic check, and get rid of the lengthened steel rope. Once the rope got rid of reaches a certain length, the steel ropes must be replaced, so as to avoid the ill effect of breaking of the steel ropes due to the decrease of tenacity and strength. Secondly, the steel ropes will break. After the aging of steel ropes, the strength will decrease, as well as the capability in bearing weight. Steel hawsers are made of many steel ropes, and each rope features different longevity and fatigue index due to the manufacturing characteristics and the materials of its own, and that even prevails in the same steel ropes made of the same batch of materials. Besides, the strength and the tenacity vary with the changes of the locations of the steel ropes themselves. At the same time, the points between different steel ropes and between different parts of the ropes vary with the stresses of different causes. If steel ropes are used too long, the steel rope with weaker strength and tenacity, or a part of the rope, will crack or even break caused by the unbearable weight. Once a rope breaks, the stresses of other steel ropes will also change with it, which may result in the breaking of the whole steel hawser, thus triggering major accidents. Because the steel ropes are very long, it is difficult to determine the location that may result in accidents, the only way out is to perform periodic and across-the-board check, which will usually increase the costs for repair and maintenance.

Secondly, the current technique adopts pulleys to make steel ropes slide upward and downward, the weight bearing point for the pulleys is limited to the minor contact surface of the arc shape, as a supporting object, the surface bears too much weight, which is subject to damage or skidding; the pulleys transfer the force to the pulley supporting bar, at the same time, the supporting bar will also bear tremendous pressure, with relatively single stress surface, and it is difficult to mend it in the case of damage, which will result in rather serious accidents.

Thirdly, the power of the elevator lifting system mentioned above is provided by the additional electric motor. When the electric motor fails or there is a sudden power blackout, the elevator will no longer work without power, which will surely trap the passengers within the elevator compartment, at the time, the people trapped in the compartment will have to ask for help from people outside the compartment, otherwise, there will be danger for them. Psychological harm will be done even after they escape. In case the elevator compartment is suspended between the upper and the lower stories, the rescue task will become extremely difficult. Therefore, the problems mentioned above must be watched out at any time, which will certainly impose much pressure on the repair and maintenance of the elevators.

Fourthly, there is considerable difficulty and risk during elevator installation. The steel hawser is the most important part for the lifting elevator, and the installation of steel hawsers have to depend on the guide bracket; as a result, guide brackets have to be first made prior to installation of steel hawsers. The installation of guide brackets is performed in the air manually, which will pose dangers to installation workers. At the same time, the steel hawsers have to be first threaded through the top of the guide brackets for installation, after which the hawsers will be pulled down. The space for elevator installation is quite limited, and extreme care must be undertaken during installation, otherwise, the heavy steel hawsers will damage other equipment, or even the installation workers.

To keep the normal running of the elevators, and to guarantee the safety of passengers, frequent maintenance and repair must be undertaken for the elevators mentioned above. Despite the fact that may equipment manufacturers today feature high reliability, the hidden danger remains for the structure. To adhere to the principle of respecting the safety of human's life, we must provide passengers with a safe and reliable environment for taking elevators, which will bring forward high manual and maintenance costs. Periodic repair, maintenance and check shall be done, for example, new elevators shall be checked annually, while those elevators used for over 5 years shall be checked semiannually or even shorter. This will not only bring forward greatly increased usage costs, but also will affect the daily use of elevators, and bring much inconvenience to passengers.

The shortcomings of the elevator lifting system mentioned above lead to all kinds of frequent accidents in the elevators commonly used today, for example, sudden falling down of elevator. To address the problems mentioned above will undoubtedly bring forward better security measures to the elevators, and more reliable guarantee for the security of the elevator passengers.

Therefore, aiming at the problems mentioned above, we can provide more secure and reliable lifting structure, which will bring forward great improvement to the security and development of lifts and elevators.

SUMMARY OF THE INVENTION

The main object of the present invention is to provide a better secure and a more reliable spiral propeller is provided for lifting of elevators, which will avoid such security problems as aging of steel ropes, breaking, imbalance of pulleys, and skidding, etc. brought forward by the structure of the lifting elevators with steel ropes.

Another object of the present invention lies in that the parts bearing the weight are dispersed, so that multiple parts can bear the weight of the elevator.

Another object of the present invention is to provide a spiral propeller that will decrease the production cost of elevators, especially those elevators of high buildings, as well as the costs of daily repair and maintenance.

Accordingly, in order to accomplish the above objects, the present invention provides a better secure and a more reliable spiral propeller, which comprises:

a plurality of spiral-lifting wheels, the interlocking wheel interlocked with the spiral-lifting wheel, and the fixed track supporting the interlocking wheel; Among them:

a spiral lifting wheel is a kind of rotating wheel with spiral external teeth, which is fixed at the top of the compartment, so as to drive the compartment for upward and downward movements, and interlock with the interlocking wheel; and a plurality of interlocking rotating wheels of truncated cone shape, which can rotate along the axial direction of the wheel itself, it is evenly and vertically fixed at the appropriate location of the fixed track along the guide bracket, and cooperates with the spiral lifting wheel; the contact cooperation between its interlocking surface and the exterior wheel surface of the spiral lifting wheel is in the linear shape; and a plurality of fixing tracks are set up between the guide brackets of the elevator, i.e., between the vertical supporting brackets of the guide bracket, in the appropriate locations are set with interlocking wheels.

The structure described above prevents the invention from the dangers brought forward by the ascending and descending of the steel ropes, the single support at the pulley part is changed into multiple varying support parts between the dispersed spiral lifting wheel and the interlocking wheel, which decreases the pressure and time born by each part, and increases their longevity. At the same time, damage or loss of partial parts will not impair the whole structure of the invention, there will be new support parts wherever the spiral lifting wheels are elevated to, thus greatly improving the security performance.

The spiral-lifting wheel mentioned above can be fixed at the bottom of the elevator compartment.

There shall be at least one spiral-lifting wheel, which will be interlocked with the interlocking wheels on both sides of the fixing track on the two sides of the compartment from the two sides of the elevator compartment. The appliance will greatly increase the weight of the spiral lifting wheels, and no very strong power is needed for pulling except there is metal of considerable strength and light weight, or the elevator is very small. Generally speaking, 2, 3 or 4 spiral lifting wheels are needed, which are evenly distributed on both sides of the compartment. Each spiral lifting wheel is independently interlocked with its corresponding interlocking wheel, at the same time, the drive device can be added to enable synchronized running of multiple spiral lifting wheels. The existing drive devices are employed, for example, chain drive and gear drive.

The steel hawser elevator employs the steel ropes with vertical movement to trigger the ascending and descending of the elevator compartment, while the invention makes use of the spiral movement of the spiral lifting wheel to fulfill the upward and downward movements of the elevators and lifts. There are many supporting locations, which will vary with the changes of heights, decrease the pressure and time born by each supporting part, so as to increase the weight that can be born by the whole spiral propeller, and increase its security performance.

DETAILED DESCRIPTION OF THE PREFERRED EMBODIMENT

Figure 1:
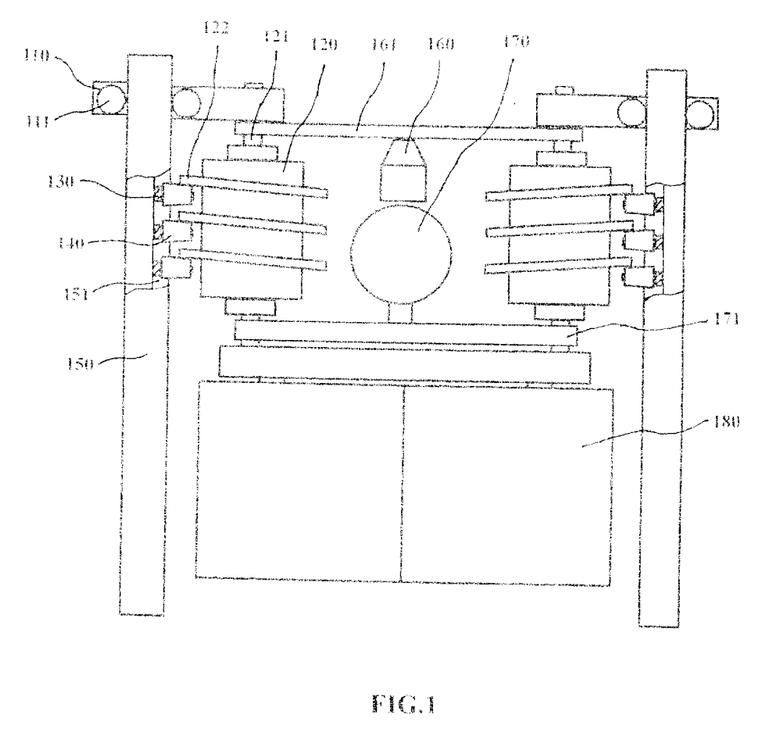
FIG. 1 is a structural sketch view of one presently preferred embodiment of the spiral propeller.
Figure 2:
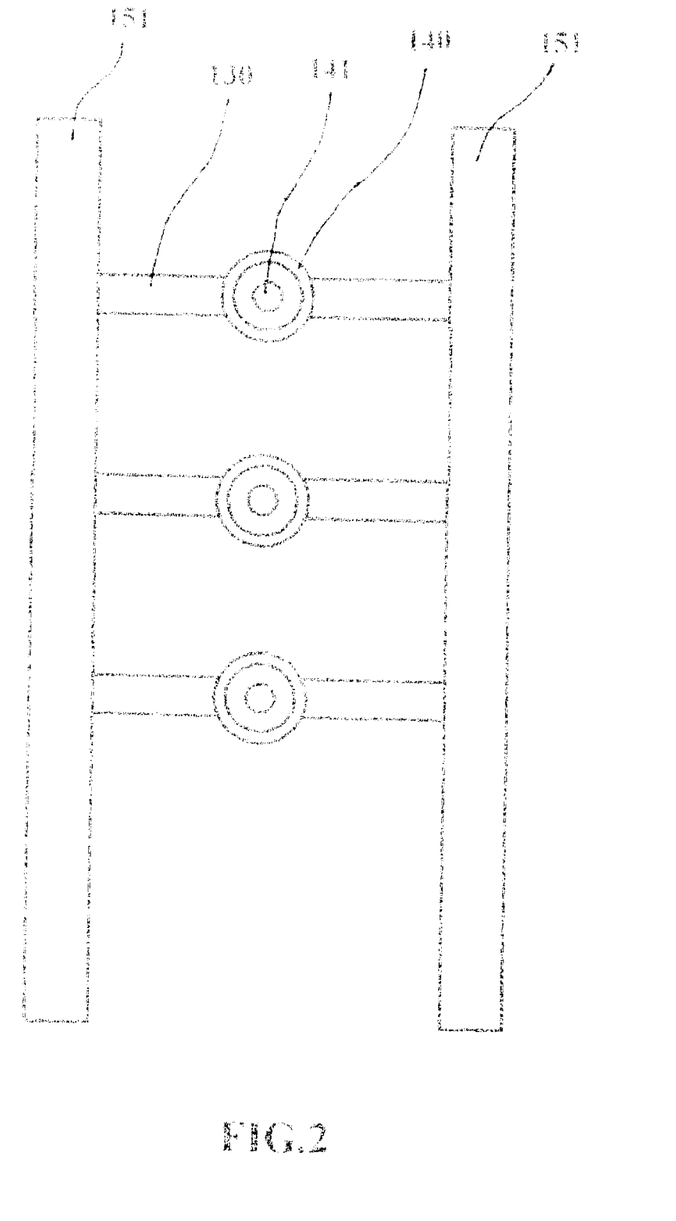
FIG. 2 is a structural sketch view of the fixed track with the interlocking wheel of FIG. 1.

As shown in FIGS. 1 and 2, the present invention includes the spiral lifting wheel 120, the drive device (170) (171), the interlocking wheel 140 interlocked with the spiral lifting wheel 120, the location limiting bracket 110 of the spiral lifting wheel 120, and the fixed track 130 supporting the interlocking wheel 140. Among them:

The spiral-lifting wheel 120 is a kind of rotating wheel with spiral external teeth 122. There are altogether two wheels 120, which are symmetrically distributed and fixed in the middle of the two sides at the top of the compartment 180, so as to drive the compartment 180 for upward and downward movements, and interlock with the interlocking wheel 140; upper end of each spiral lifting wheel 120 is fixed with the location limiting bracket 110 to restrict the spiral lifting wheel 120 during lifting for close interlocking and cooperation with the interlocking wheels 140, the other end of the location limiting bracket 110 is stuck on the vertical supporting bracket 151 of the guide bracket 150 by rolling via slide-bars or ball bearings 111.

There are at least two exterior teeth 122 for the spiral lifting wheel 120, which is convenient for interlocking and the interlocking wheel 140 cooperating with them, at the same time, avoiding the adverse impact by a single interlocking wheel 140; under the premises to meet the current security performance and lifting speed, 3 or 4 exterior teeth 122 are suitable. This embodiment has 3 exterior teeth 122.

Gear drive device 171 is chosen for drive, which been driven by electromotor 170, and which connects and fixes the two spiral lifting wheels 120 on the compartment 180, and is connected to the two axles 121 for the spiral lifting wheel 120, running synchronously with them.

Interlocking wheel 140: it is a kind of rotating wheel of truncated cone shape, which can rotate along the axial direction of the wheel itself, it is evenly and vertically fixed at the appropriate location of the fixed track 130 along the vertical supporting bracket 151 of the guide bracket 150, and cooperates with the spiral lifting wheel 120; the contact cooperation part between its interlocking surface and the exterior wheel surface of the spiral lifting wheel 120 is in the linear shape, and the vertex of the cone of interlocking wheel is in accordance with the contact surface of the exterior teeth 122 of the spiral lifting wheel 120;

The fixing track 130 is set up between the guide brackets 150 of the elevator, i.e., between the vertical supporting brackets 151 of the guide bracket 150, in the appropriate locations are set with interlocking wheels 140 by providing interlocking axles 141.

As illustrated in FIG. 1, because the exterior teeth 122 of the spiral lifting wheel are in the spiral shape, the interlocking wheels 140 cooperating with them are in the form of truncated cone, which are set in the middle of the fixing track 130, and the vertex of the cone of the interlocking wheel 140 is in accordance with the central spiral point of the exterior teeth 122 of the spiral lifting wheels 120.

During the rotation of the interlocking wheels, because the interlocking surface is non-horizontal, the weight it bears may be dispersed, in addition, the force dispersed can pull it for rotation, so as to present the minimum resistance for re-startup when the propeller stops ascending or descending.

As shown in FIG. 2, there are multiple fixing tracks 130, which are evenly and horizontally set between the vertical supporting brackets 151 of the guide bracket 150 upwards and downwards.

One of the prefer embodiments of the present invention is to provide the spiral lifting wheels 120 mentioned above can be fixed at the bottom of the elevator compartment 180, its fixed connection with the compartment 180 can employ the same mode with that fixed at the top of the elevator compartment 180, other settings as the corresponding interlocking wheels 140, drive devices and fixing tracks 130 are also the same as the descriptions mentioned above.

There shall be at least one spiral lifting wheel 120, which will be interlocked with the interlocking wheels 140 on both sides of the fixing track 130 on the two sides of the compartment 180 from the two sides or four sides of the elevator compartment 180. The appliance will greatly increase the weight of the spiral lifting wheels 120, except there is metal of considerable strength and lightweight. In generally, 2 or 3 spiral-lifting wheels 120 are needed, and each is independently interlocked with its corresponding interlocking wheel 140. Certainly, this will lead to the problem of synchronous running between different spirals lifting wheels 120. In the actual manufacturing, an ideal solution is to adopt two spiral lifting wheels 120, and chains or other similar objects are employed between the spiral lifting wheels 120, for example, by adopting the 3-gear drive mode to realize synchronized running of the spiral-lifting wheels, as shown in FIG. 1.

As shown in FIG. 1, to stop running, it is sufficient to lock the axles 121 of the spiral lifting wheels 120 with the brake shoe 161 of hydraulic brake 160.

Figure 3:
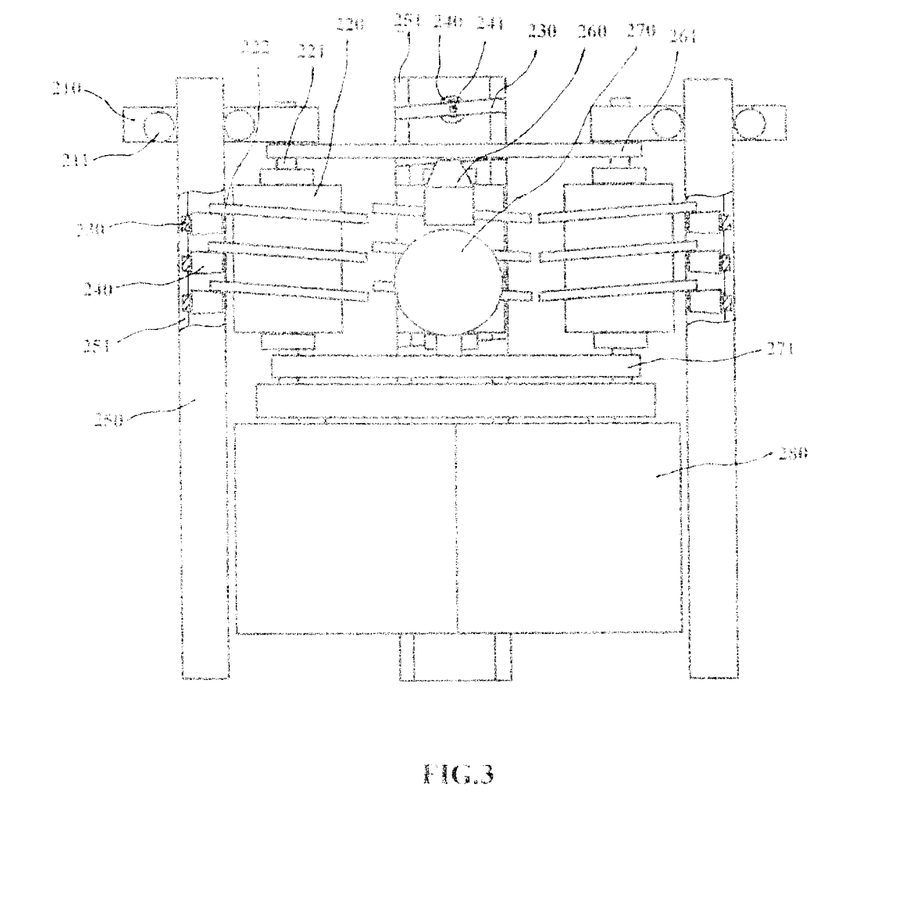
FIG. 3 is a structural sketch view of another presently preferred embodiment of the spiral propeller.

One of the prefer embodiments of the present invention as shown in FIG. 3, 3 spiral-lifting wheels 220 are used. It includes spiral lifting wheels 220, interlocking wheels 240 and drive devices (270) (271), the spiral lifting wheels 220 are respectively located at the rear and the two ends on the top of the compartment 280, and its structure is almost the same as that is illustrated in FIG. 1. To address the problem of synchronized running of the 3 spiral lifting wheels, 3 sets of interlocking gears can be employed, the 3 sets of gears interlock with each other, and run synchronously with the spiral lifting wheels; as a simple solution, the chain 271 driven by electromotor 270 is respectively fixed on the axles 221 driving the running of the spiral lifting wheel 220, it be located between the spiral lifting wheel 220 and the compartment 280. When the spiral-lifting wheel 220 ascends or descends, the chain mentioned above run synchronously, too. By cooperating with each other, the 3 spiral lifting wheels 220 run synchronously as shown in FIG. 3.

Similarly, the upper end of each spiral lifting wheel 220 shown in FIG. 3 are fixed with the location limiting brackets 210, which are used to restrict the spiral lifting wheels 220 in closely cooperating with the interlocking wheels 240 during ascending or descending. The other end of the location limiting bracket 210 is stuck on the vertical supporting bracket 251 (shown in FIG. 4) of the guide bracket 250 by ball bearings 211.

As shown in FIG. 3, to stop running, it is sufficient to lock the axles 221 of the spiral-lifting wheels 220 with the brake shoe 261 of hydraulic brake 260.

Figure 6:
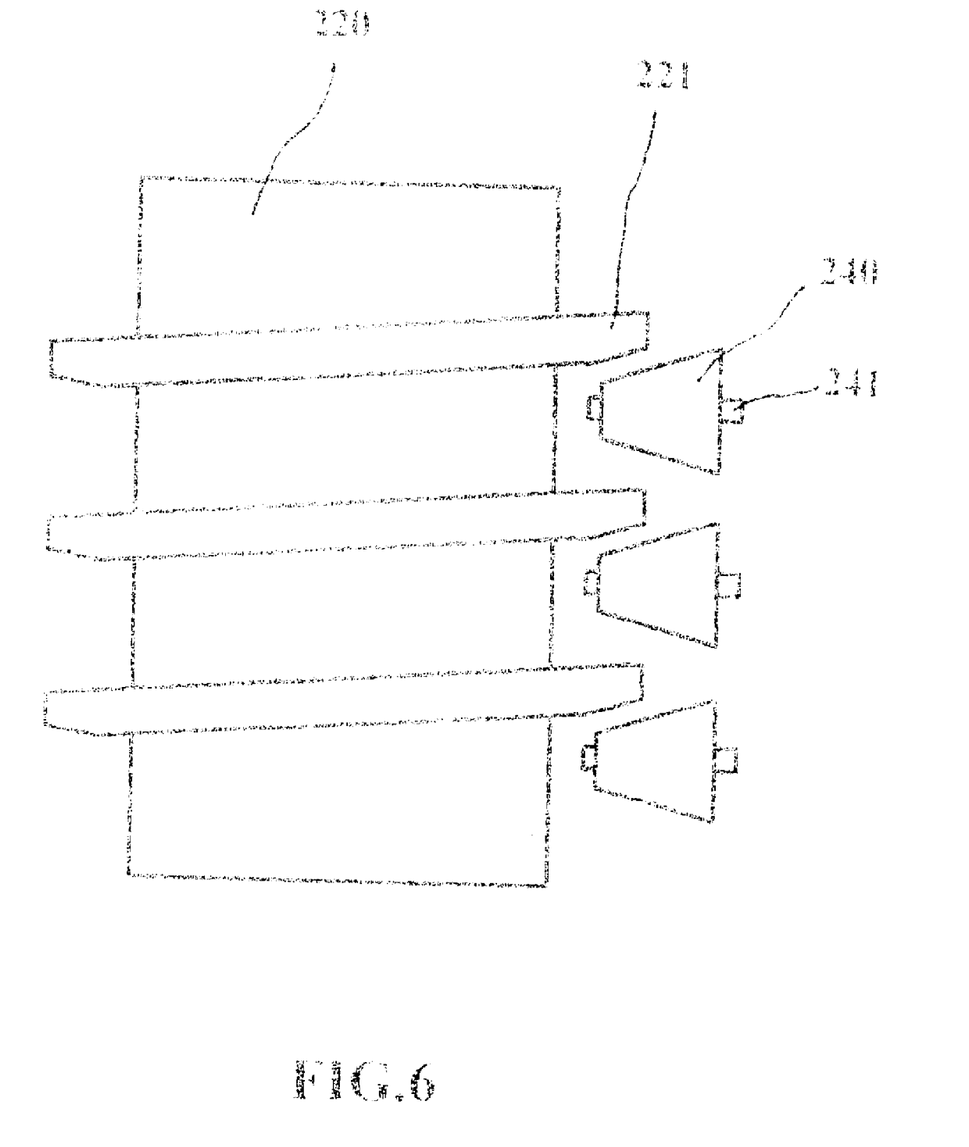
FIG. 6 is a schematic view of the spiral lifting wheel and the interlocking wheel of the FIG. 3.

In general, the bottom edge of the exterior teeth 222 of the spiral-lifting wheel 220 is less than an inclination of 30° with the horizontal line. In the actual manufacturing, as shown in FIG. 6, a part of the bottom of the exterior teeth 222 of the spiral lifting wheel can be cut off along the horizontal line. The cut off part is limited to the contact surface between the spiral lifting wheel 220 and the interlocking wheel 240, without affecting the supporting role played by the exterior teeth 222 of the spiral lifting wheels 220 mentioned above.

At the same time, the bevel edge of the truncated cone of the interlocking wheel's contact shall overlap with the contact surface of the exterior teeth 222 of the spiral lifting wheel 220, and the cone vertex of the interlocking wheel 240 shall be in accordance with the central point of the contact surface formed after truncating, i.e., the same linear speed shall be kept during rotation at the overlapped part of the two, so as to achieve the effect of smooth ascending and descending, as shown in FIG. 6.

Figure 4:
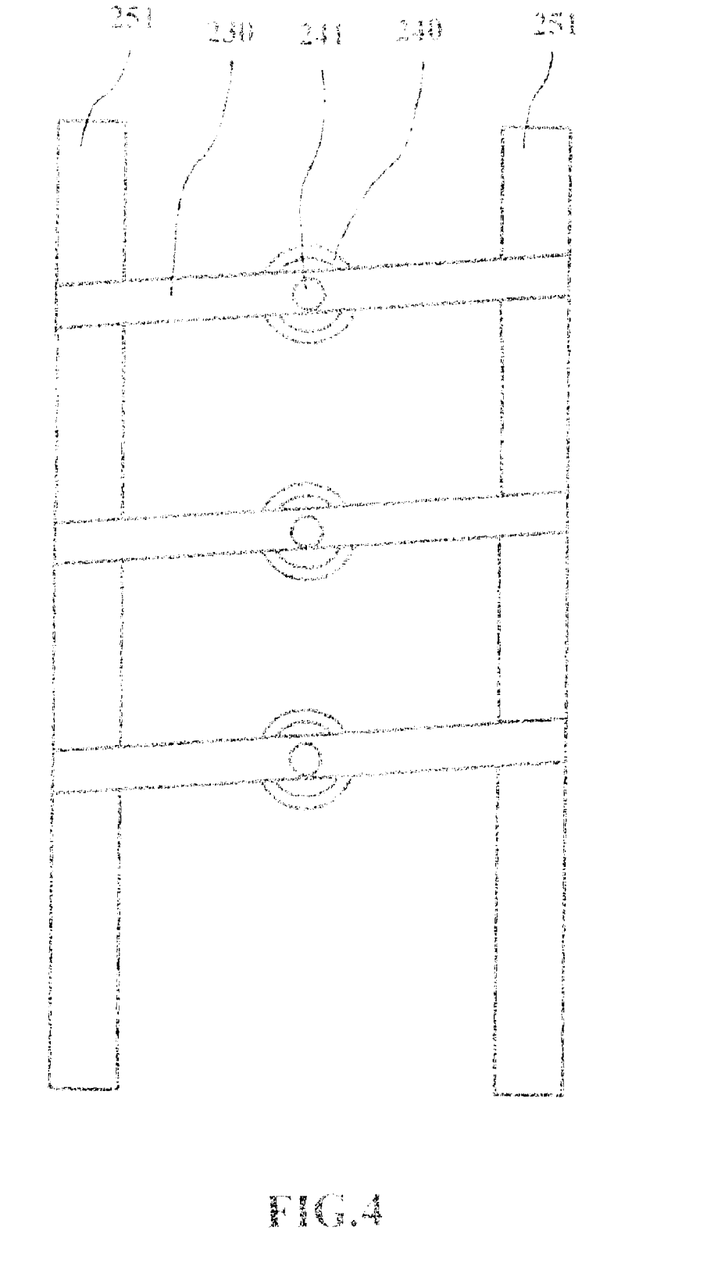
FIG. 4 is a structural view of the fixed track with the interlocking wheel of FIG. 3.

There are multiple fixing tracks 230, which are evenly and horizontally set between the vertical supporting brackets 251 of the guide bracket 250 upwards and downwards, and are slantwise set between the vertical guide brackets 251 by adopting the same inclination as the spiral angle of the exterior teeth 222 of the spiral lifting wheels 220, as shown in FIG. 4. The fixing track 230 supports the interlocking teeth via the interlocking axles 241 form both ends of the interlocking wheel 240, so as to enhance the supporting strength on the interlocking wheel 240.

Figure 5:
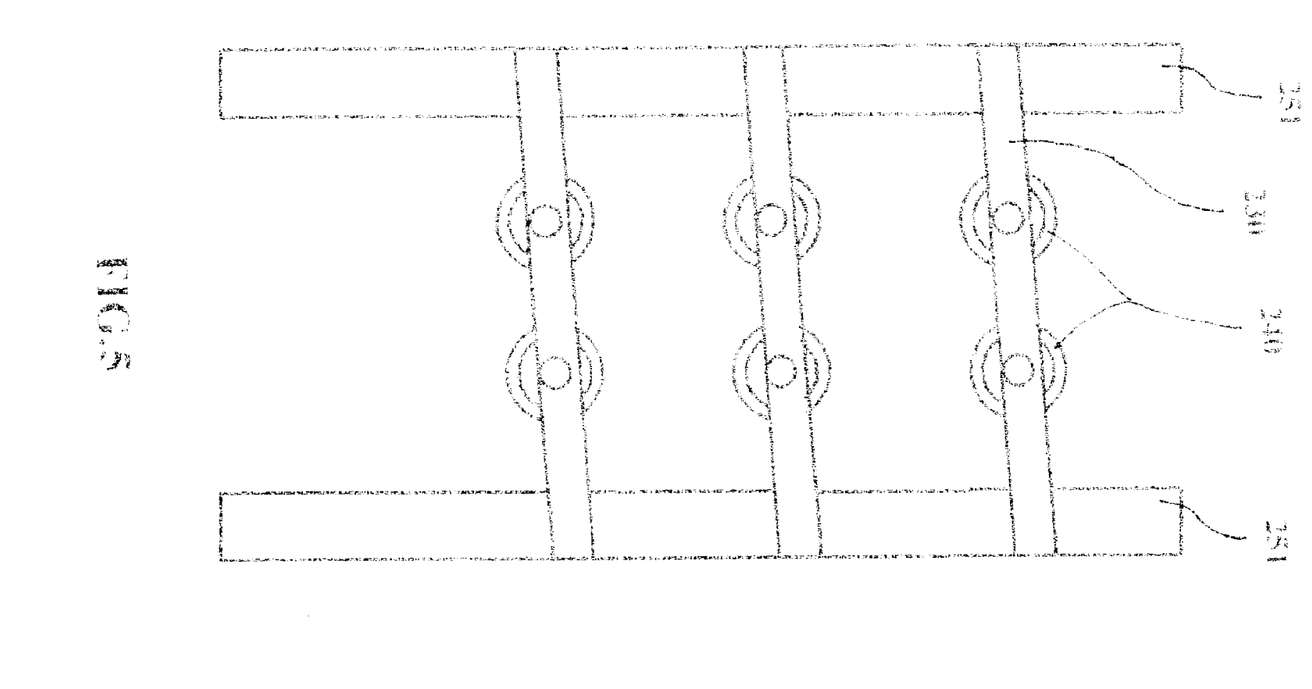
FIG. 5 is another structural view of the fixed track with the interlocking wheel of FIG. 3 illustrating various components of the present invention.

As shown in FIG. 5, multiple interlocking wheels 240 can be set for a single fixing track 230, the inclination device mentioned above is employed for the fixing track 230, and its inclination is the same as that of the exterior teeth 222 of the spiral lifting wheels 220. The fixing track 230 is in the circular arc shape similar to the spiral line of the exterior teeth 222 of the spiral lifting wheel 220, or is beeline corresponds to the spiral lifting wheel 220, so as to cooperate with the interlocking wheel 240 perfectly via the interlocking fixed by the interlocking axle 241.

Yet, multiple interlocking wheels can be adopted for the fixing track horizontally set up, in the mode similar to that illustrated in FIG. 1. The difference lies in that each interlocking wheel at the same side must corresponds to a spiral lifting wheel, all these spiral lifting wheels on the same side are restricted by the same location limiting bracket. To alleviate the restriction by the space on the same side of the compartment, the number of the spiral lifting wheels set up on the same side of the compartment shall not exceed two.

Figure 7:
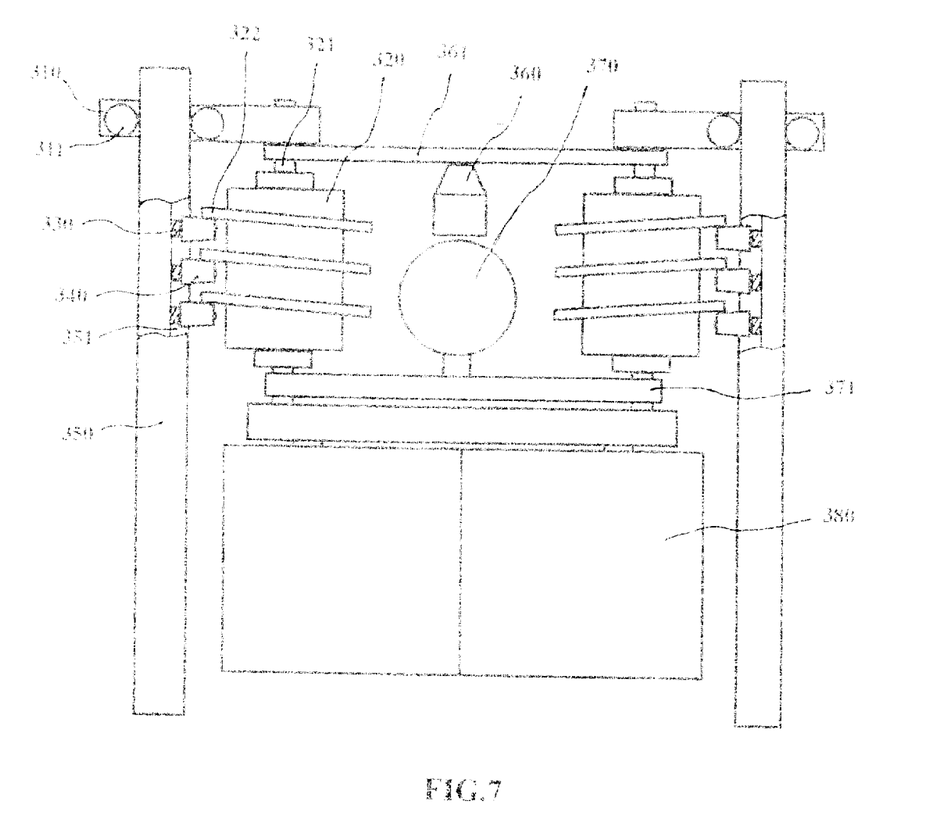
FIG. 7 is a structural sketch view of another presently preferred embodiment of the spiral propeller.
Figure 8:
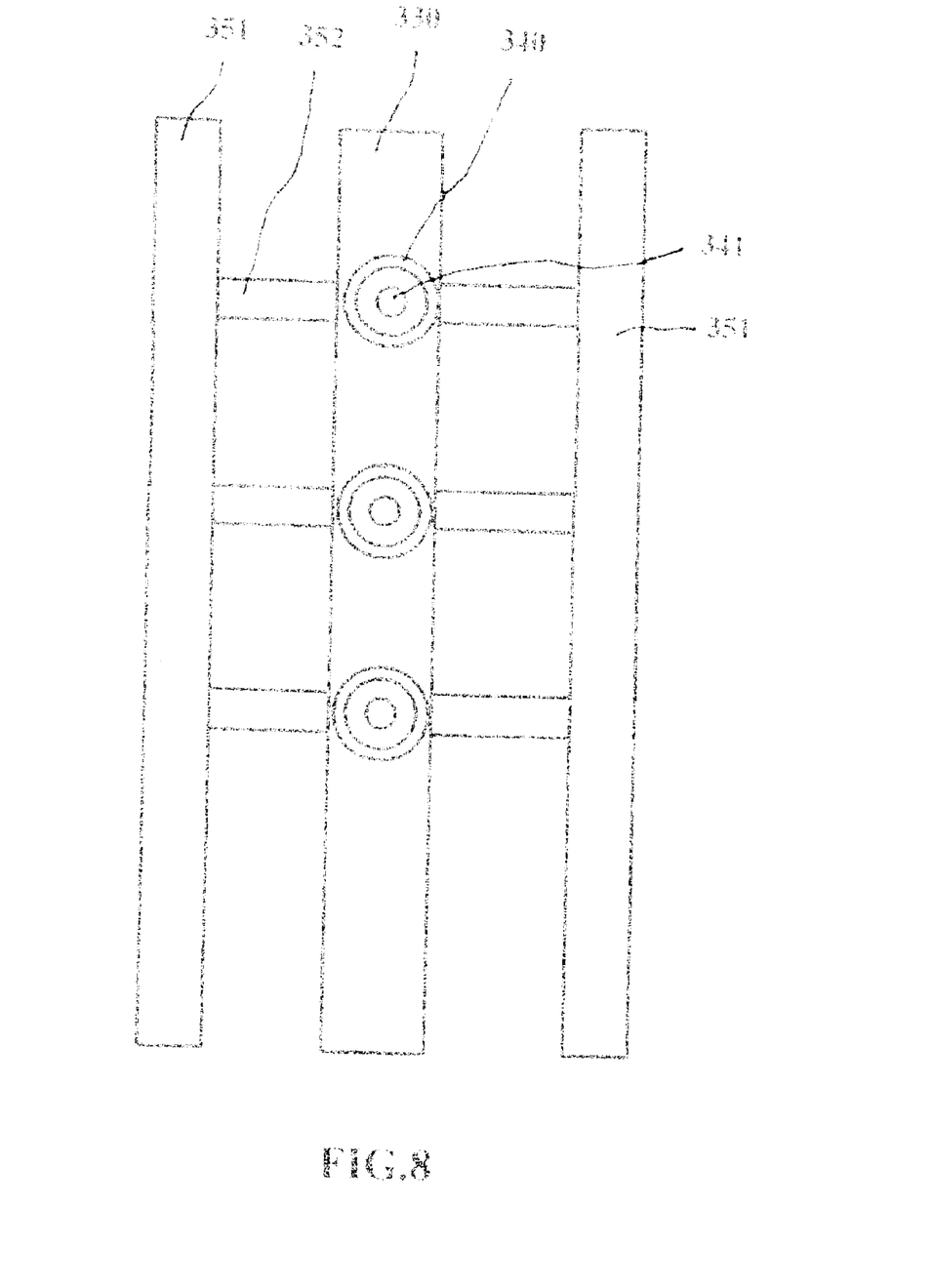
FIG. 8 is a structural sketch view of the fixed track with the interlocking wheel of FIG. 7.

One of the prefer embodiments of the present invention is to set the fixing track 330 longitudinally between the vertical supporting brackets 351 of the guide brackets 350, as shown in FIGS. 7 and 8. To enhance the support by the guide brackets 350 on the fixing track 330, on the one hand, the fixing track 330 is fixed, and extends the interlocking wheel 340; on the other hand, the fixing track 330 is braced by the cross bar 352 fixed on the vertical supporting brackets 351 of the guide brackets 350. The cross bar 352 had better be fixed in the middle of the fixing track 330, or the part set with interlocking wheels 340, the interlocking wheels 340 fixed by the fixing track 330 are extended to the compartment 380 horizontally in the axial direction.

As shown in FIG. 7, all the other structures, such as the spiral lifting wheels 220, the exterior teeth 322 of the spiral lifting wheel 320, the axles 321 of the spiral lifting wheel 320, the location limiting brackets 310, the ball bearings 311, the interlocking wheels 340, the brake shoe 361, the hydraulic brake 360 and the drive devices including electromotor 370 and gear drive device 371 are the same as shown in FIG. 1, different only in that the form of the fixing track 330 has changed.

FIG. 8 clearly illustrates the extension and fixing of the fixing track 330. The fixing track 330 extends parallel to the vertical supporting bracket 351 of the guide bracket 350, runs through the whole guide bracket 350, and fixed onto the supporting bracket 351 by multiple cross bars 352. The fixing track 330 braces in the direction of the spiral-lifting wheel 320 via the interlocking axles 341, and extends out of the interlocking wheels 340.

The similar fixing track can also be set in the lifting system with certain obliquity, the spiral lifting wheels are also set in obliquity correspondingly, which are only set on one side of the corresponding fixing track, so as to cooperate with the interlocking wheels. To enhance the security performance and stability for ascending and descending, two spiral lifting wheels can be set on the same side, and it is sufficient to perform the corresponding modifications on other components.

As far as the lifting of a single spiral lifting wheel is concerned, the structure can be simplified by adopting the out rotor spiral electric motor, i.e., the shell of the out rotor spiral electric motor is gear, which cooperates with the interlocking wheels mentioned above. The electric directly drives the rotation of the gears of the shell. The electric motor is fixed on the compartment, cooperates with the interlocking wheels, and moves upwards and downwards. The interlocking wheels can be configured only on one side of the compartment, while the corresponding tracks corresponding to the gears mentioned above are set on the other side. It is sufficient for the exterior teeth to interlock with the interlocking wheels on only one side.

What is claimed is:

1. An elevator, comprising:
   a compartment; and
   a spiral propeller which comprises:
   at least two spiral lifting wheels, each having an axle and two or more spiral external teeth thereon, being symmetrically distributed and affixed in a middle of two sides at a top of said compartment so as to drive said compartment upwardly and downwardly;
   two or more guide brackets each having a vertical supporting bracket;
   fixed tracks supporting a plurality of locking wheels, wherein said fixed tracks are set between said vertical supporting brackets of said guide brackets;
   said locking wheels interlocked with said spiral lifting wheels through said spiral external teeth, wherein each of said interlocking wheels is rotatable along an axial direction thereof and evenly and vertically affixed at a predetermined location of said respective fixed track along said vertical supporting bracket of said respective guide bracket, wherein a contact cooperation part positioned between an interlocking surface of each of said interlocking wheels and an exterior wheel surface of said respective spiral lifting wheel is in a linear shape and a vertex of a cone of each of said interlocking wheels is in accordance with said contact surface of said exterior teeth of said respective spiral lifting wheel;
   two or more location limiting brackets each having a first end and a second end, wherein said first ends of said location limiting brackets are affixed at upper ends of said spiral lifting wheels respectively to restrict said spiral lifting wheels during lifting for close interlocking and cooperation with said interlocking wheels while said second ends of said location limiting brackets are mounted on said vertical supporting brackets of said guide brackets respectively;
   an electromotor;
   a gear drive device, which is driven by said electromotor, connecting and affixing said spiral lifting wheels on said compartment by connecting said two axles of said spiral lifting wheels, running synchronously; and a hydraulic brake comprising a brake shoe to stop running by locking said axles of said spiral lifting wheels.

2. The elevator, as recited in claim 1, wherein said spiral lifting wheel is affixed to said compartment.

3. The elevator, as recited in claim 2, wherein each of said exterior teeth of each of said spiral lifting wheels has a cut off part which is limited to said contact surface between said spiral lifting wheel and said interlocking wheel, wherein, at the same time, a bevel edge of a truncated cone of a contact of said interlocking wheel overlaps with said contact surface of said exterior teeth of said spiral lifting wheel and a cone vertex of said interlocking wheel is formed after truncating in accordance with a central point of said contact surface.

4. The elevator, as recited in claim 1, wherein said fixed tracks are slantwise set between said vertical guide brackets by adopting an inclination same as a spiral angle of said exterior teeth of said spiral lifting wheels, wherein each of said interlocking wheels is set for one of said fixed tracks with respect to a spiral line of said exterior teeth of said spiral lifting wheel, corresponding to said spiral lifting wheel.

5. The elevator, as recited in claim 1, wherein said fixed tracks are evenly and horizontally set between said vertical supporting brackets of said guide brackets.

6. The elevator, as recited in claim 1, wherein each of said fixed tracks is set longitudinally between said vertical supporting brackets of said guide brackets.

7. The elevator, as recited in claim 6, wherein each of said fixed tracks extends parallel to said vertical supporting bracket of said guide bracket, runs through said guide bracket, and is affixed onto said supporting bracket by multiple cross bars.

* * * * *